United States Patent [19]

Utsumi et al.

[11] Patent Number: 5,251,199
[45] Date of Patent: Oct. 5, 1993

[54] LASER DIODE DRIVE CONTROL APPARATUS

[75] Inventors: Yoshihiro Utsumi; Yoshiyuki Kakuta, both of Tokorozawa, Japan

[73] Assignee: Pioneer Electronic Corporation, Tokyo, Japan

[21] Appl. No.: 899,883

[22] Filed: Jun. 17, 1992

[30] Foreign Application Priority Data

Nov. 8, 1991 [JP] Japan ................... 3-293412

[51] Int. Cl.$^5$ ................................................ G11B 7/00
[52] U.S. Cl. ................................ 369/116; 369/54; 369/44.11; 369/44.25
[58] Field of Search ............... 369/116, 121, 112, 54, 369/59, 47, 48, 44.11, 44.29, 44.35, 53, 44.32, 58

[56] References Cited

U.S. PATENT DOCUMENTS

| 4,516,242 | 5/1985 | Yokota | 369/116 X |
| 4,800,548 | 1/1989 | Koishi et al. | 369/54 |
| 4,890,273 | 12/1989 | Takeuchi et al. | 369/58 X |
| 4,982,397 | 1/1991 | Yokota | 369/54 X |
| 5,101,392 | 3/1992 | Yoshimani et al. | 369/44.32 X |
| 5,101,396 | 3/1992 | Takeuchi et al. | 369/116 |
| 5,136,569 | 8/1992 | Fennema et al. | |

FOREIGN PATENT DOCUMENTS

| 0370483 | 5/1990 | European Pat. Off. | |
| 0119547 | 7/1984 | Japan | 369/116 |
| 0276713 | 11/1988 | Japan | 369/44.39 |
| 0112533 | 5/1989 | Japan | 369/122 |
| 1-0297703 | 10/1991 | Japan | |

Primary Examiner—Andrew L. Sniezek
Assistant Examiner—Thang V. Tran
Attorney, Agent, or Firm—Keck, Mahin & Cate

[57] ABSTRACT

In an apparatus for detecting an abnormality of an optical system in a reproducing and recording apparatus of an optical recording medium and executing a driving control of a laser diode, detection of abnormality is performed with the optical system set into a de-focusing state. The apparatus has control device for comparing a level of a first detection signal having the level according to the level of first light beam which is led to the optical recording medium and a level of a second detection signal having the level of the second light beam, thereby controlling a driving current. The control device turns off a loop switch of a focusing servo loop of an objective lens, thereby setting the lens into a de-focusing mode, compares the levels of the first and second detection signals after the de-focusing state of the lens by the actuator is obtained, to discriminates whether a ratio of those levels lies within a predetermined range or not; and shuts off the driving current when it is determined that the ratio is out of the predetermined range.

2 Claims, 5 Drawing Sheets

LASER DIODE DRIVE CONTROL APPARATUS

BACKGROUND OF THE INVENTION

1. Field of the Invention

The present invention relates to an apparatus for controlling a laser diode irradiating a light beam on an optical recording medium.

2. Description of Background Information

In case of recording, reproducing, and erasing information by irradiating light beam to an optical magnetic recording medium such as a magento-optic disc or the like, a stronger light beam is needed for recording an erasing information rather than in reproduction of recorded information from the optical magnetic recording medium. Hitherto, an output adjustment of such a light beam is performed by an APC (Automatic Power Control) operating in such a manner that a part of the light beam generated from a laser diode is detected by a photodetector and the driving of the laser diode is controlled in accordance with a detection output.

According to the conventional control method as mentioned above, however, when the detection output according to the light beam is not obtained from the photodetector due to dew condensation, a failure, or the like, it is judged that the light beam has been reduced, thereby performing a control operation to raise the output of the laser diode. As a result of the control operation, the laser diode will irradiate a stronger laser beam on the optical magnetic recording medium, which in turn create a problem that the information recorded on the optical magnetic recording medium is erased even during a period in which recorded data is being reproduced.

A laser diode drive control apparatus shown in FIG. 1 has recently been devised with an aim to solve such a problem of the prior art. In such an apparatus, a light beam for recording and reproducing information is generated by a laser diode 1. An optical system comprising a collimating lens 4, a beam splitter 5, and an objective lens 6 is provided to lead the light beam to an optical recording medium 3 which is rotated by a spindle motor 2. The apparatus also includes recording information signal detecting means 7 for receiving the light beam reflected from the optical recording medium 3 and for detecting the recording information signal of the optical recording medium 3. The laser diode 1 irradiates the beam in two, namely first and second, directions. The beam in the first direction passes through the collimating lens 4 and beam splitter 5 and enters a first photodetector 8. The first photodetector 8 transmits an output according to a light reception amount to a first comparator 9 and a second comparator 10. The first comparator 9 sends a comparison output corresponding to a difference between the output from the photodetector 8 and a reference input REF to a control circuit 11. The beam in the second direction from the laser diode 1 enters a second photodetector 12. The second photodetector 12 sends an output according to a light reception amount to the second comparator 10 in a manner similar to the first photodetector 8. The second comparator 10 compares the absolute values of the outputs of the first and second photodetectors 8 and 12 and generates a positive voltage corresponding to a difference between them to the control circuit 11. The control circuit 11 gives a driving current according to the output of the first comparator 9 to the laser diode 1, thereby controlling the driving of the laser diode 1 so as to irradiate the light beam of a proper intensity to the optical recording medium 3. The control circuit 11, further, detects whether or not the value of the positive voltage of the second comparator 10 lies within a predetermined range. When the positive voltage value is equal to or larger than a predetermined value, the control circuit 11 generates an abnormality detection signal by judging that an abnormality has occurred in the optical transmission system including the first and second photodetectors 8 and 12. Simultaneously with the generation of the abnormality detection signal, the control circuit 11 shuts off the driving current being supplied to the laser diode 1, thereby stopping the driving of the laser diode 1.

In case of control operation which is performed by detecting the light beams in two directions by means of two separate photodetectors as in the apparatus described above, however, there is a problem that output characteristics of the light beam are changed due to an influence by the return light, so that an accurate control operation cannot be performed.

OBJECT AND SUMMARY OF THE INVENTION

The present invention has been made to solve such problems and it is an object of the invention to provide a laser diode drive control apparatus that detects an abnormality of an optical system at a high precision, to control the driving of a laser diode.

A laser diode drive control apparatus according to the invention comprises: a laser diode irradiating first and second light beams in front and rear directions, said light beams having an intensity according to a magnitude of a driving current being supplied; optical transmission means including an objective lens for leading the first light beam to an optical recording medium; a focusing servo loop for driving an actuator of the objective lens, thereby executing a focusing servo operation; first light beam detecting means for generating a first detection signal having a level according to the level of the first light beam which is led to the optical recording medium; second light beam detecting means for generating a second detection signal having a level according to the level of the second light beam; and control means for comparing the levels of the first and second detection signals and controlling the driving current, wherein the control means comprises first means for turning off a loop switch of the focusing servo loop of the objective lens and setting the lens into a de-focusing state, discriminating means for comparing the levels of the first and second detection signals after the de-focusing state of the leans by an actuator by the first means is established, thereby discriminating whether a ratio of levels of the detection signals lies within a predetermined range or not, and second means for shutting off the driving current when it is determined that the ratio is out of the predetermined range.

DETAILED DESCRIPTION OF THE PREFERRED EMBODIMENT

An embodiment of the present invention will be described in detail hereinafter with reference to the accompanying drawings.

Figure 1:
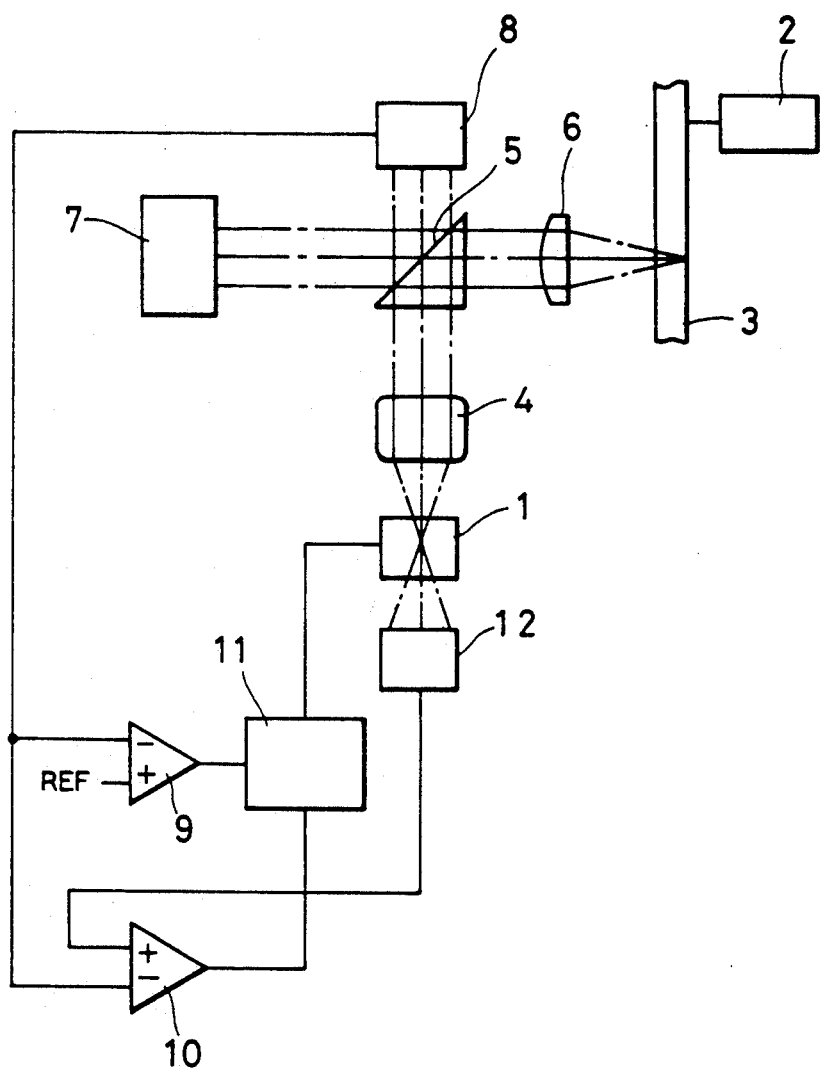
FIG. 1 is a diagram showing the construction of a conventional laser diode drive control apparatus.
Figure 2:
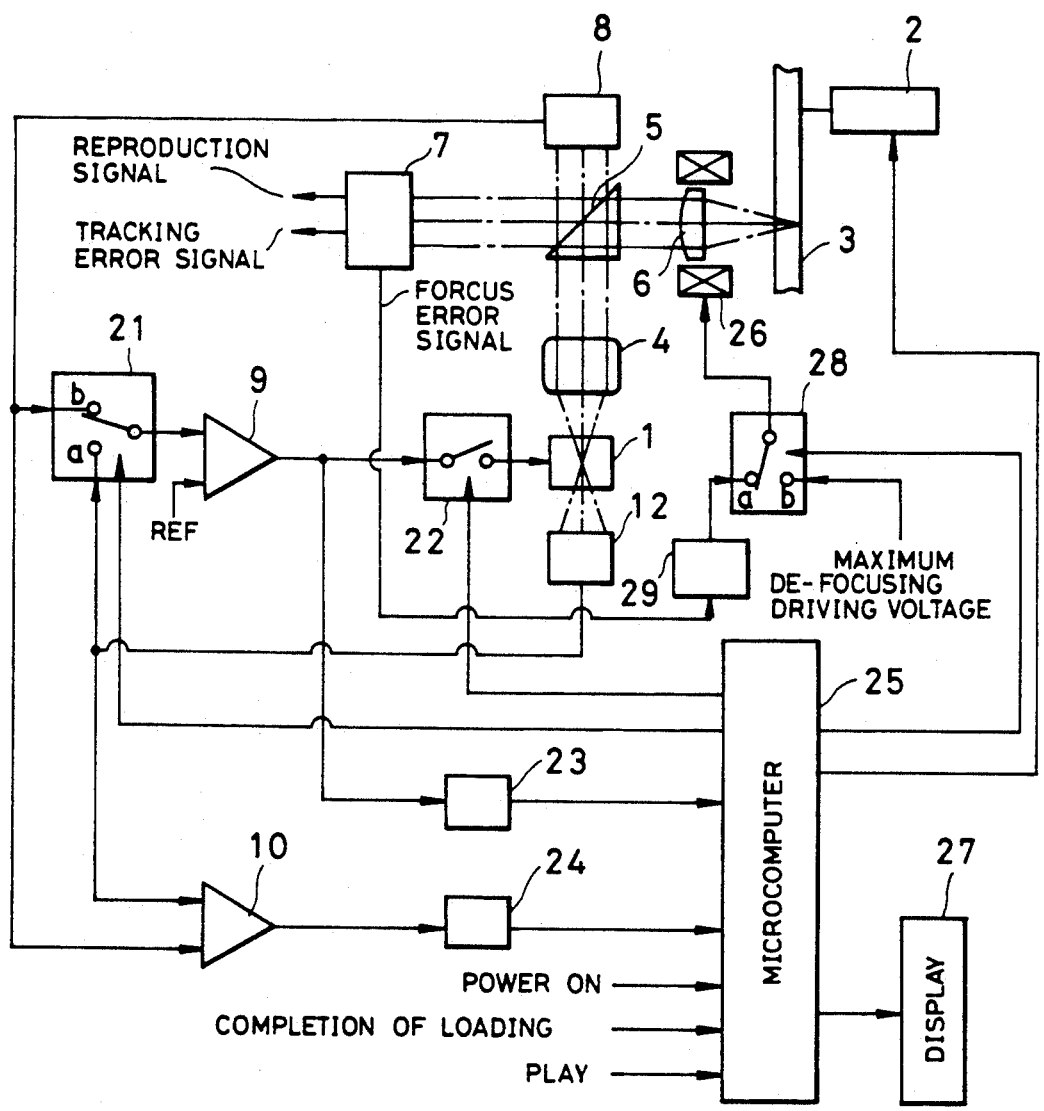
FIG. 2 is a diagram showing the construction of a laser diode drive control apparatus according to the present invention.

A laser diode drive control apparatus according to the invention is shown in FIG. 2, in which a light beam for recording and reproducing information is generated by the laser diode 1. The optical system comprising the collimating lens 4, beam splitter 5, and objective lens 6 is provided in order to lead the light beam to the optical recording medium 3 which is rotated by the spindle motor 2. The apparatus also includes the recording information signal detecting means 7 for receiving the light beam reflected from the optical recording medium 3 and for detecting a reproduction signal, a tracking error signal, and a focus error signal. The laser diode 1 irradiates beams in two first and second directions. The beam in the first direction (hereinafter, referred to as a front beam) passes through the collimating lens 4 and beam splitter 5 and enters the first photodetector 8. The first photodetector 8 sends an output according to a light reception amount to a terminal b which is one of terminals a and b of selecting switch means 21 and also to the second comparator 10. The beam in the second direction (hereinafter, referred to as a rear beam) from the laser diode 1 enters the second photodetector 12. The second photodetector 12 sends an output according to a light reception amount to the terminal a of the selecting switch means 21 and also to the second comparator 10 in a manner similar to the first photodetector 8. The first comparator 9 sends a driving signal of the laser diode 1 corresponding to a difference between a signal from a common terminal of the selecting switch means 21 and the reference input REF to a window comparator 23. The driving signal is connected to the laser diode 1 through shut-off switch means 22. The second comparator 10 compares the absolute values of the outputs of the first and second photodetectors 8 and 12 and generates a positive voltage according to a difference between them to a window comparator 24. Each of the window comparator 23 and 24 compares whether the input signal level exceeds a predetermined level range or not. When the input signal level exceeds the predetermined level range, each window comparator sends a detection signal to control means 25. An actuator 26 to perform a focusing adjustment of the objective lens 6 changes a focusing adjustment amount in accordance with a signal level from a common terminal of loop switch means 28 of the focusing servo loop. A signal which is derived by supplying the focus error signal from the recording information signal detecting means 7 through a focusing control 29 is connected to a terminal a which is one of selection terminals a and b of the loop switch means 28. The focusing servo loop is formed by a connection path comprising the recording information signal detecting means 7, focusing control 29, loop switch means 28, and actuator 26 in this instance. A driving voltage of the actuator 26 to set the objective lens 6 into the maximum de-focusing state is applied to the terminal b the loop switch means 28.

The control means 25 is constructed by, for example, a microcomputer and controls the spindle motor 2, selecting switch means 21, shut-off switch means 22, display means 27, and loop switch means 28 in accordance with an operation instruction from the outside, predetermined instructions which have previously been stored, and the outputs of the window comparator 23 and 24.

Figure 3:
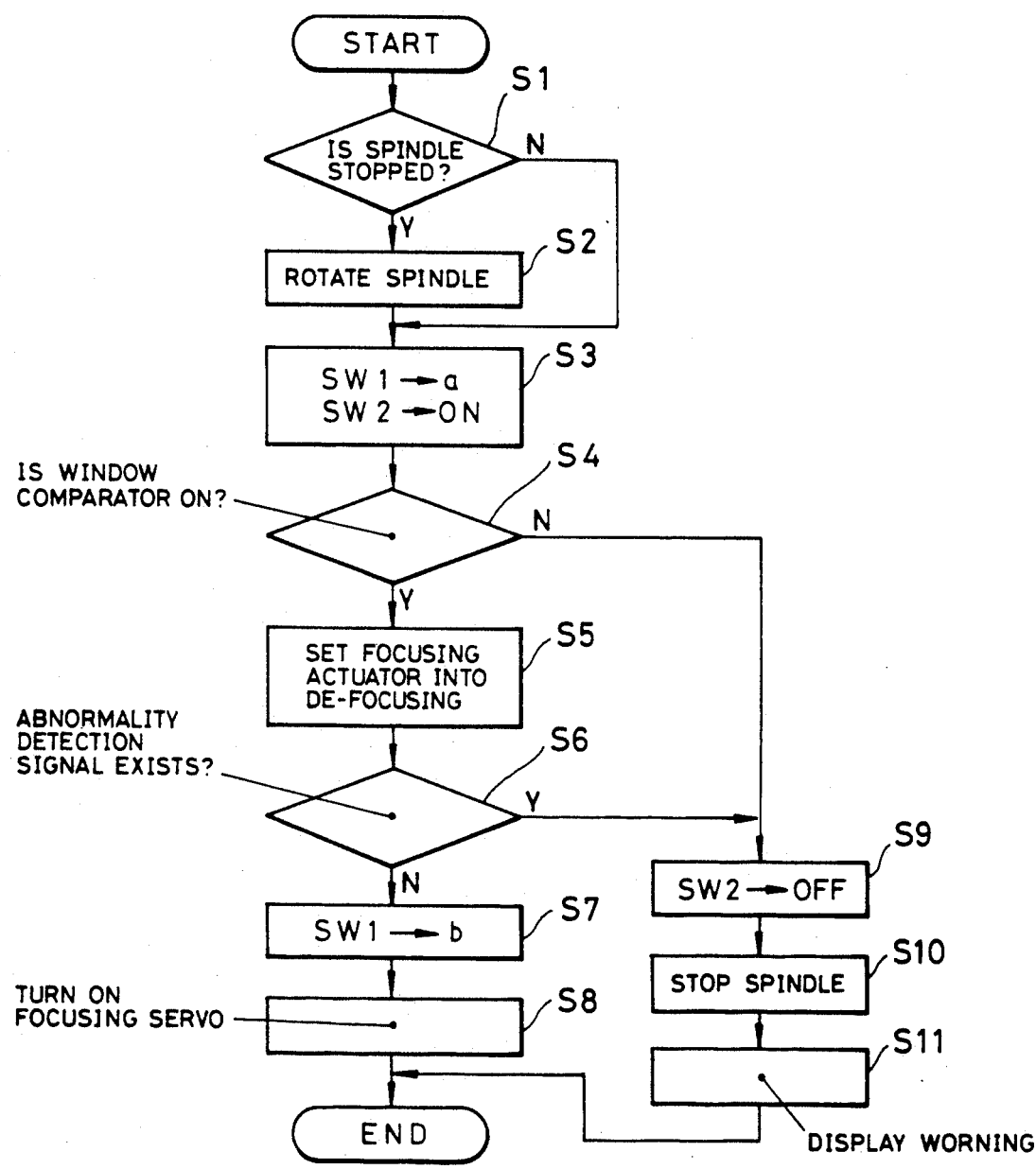
FIGS. 3 and 4 are control flowcharts of the laser diode drive control apparatus according to the invention.

The operation of the control means 25 in the construction as mentioned above will now be described with reference to a flowchart of FIG. 3.

The control operation according to the embodiment is automatically executed at the time of power-on, upon completion of the loading of the optical recording medium 3, and just before the recording and reproducing operations are started. First, the operating mode of the spindle motor 2 is checked (step S1). When it is determined that the spindle motor 2 is in the stop mode, a rotation driving command is given to the spindle motor 2 (step S2). To detect a failure of the laser diode 1, the common terminal of the selecting switch means 21 is connected to the terminal a. The shut-off switch means 22 is closed. The first comparator 9, consequently, compares the output of the second photodetector 12 and the reference input REF and generates the laser diode driving current according to the result of the comparison to the laser diode 1 and window comparator 23 (step S3). In step S3, a check is made to see if the obtained comparison result lies within a predetermined range set in the window comparator 23 or not (step S4). In step S4, when it is determined that the obtained comparison result lies within the predetermined range set in the window comparator 23, the loop switch 28 is turned off (the common terminal is connected to the terminal b), the maximum de-focusing driving voltage is applied to the actuator 26, and the objective lens 6 is positioned to the most deviated position from the neutral position and is fixed into the maximum de-focusing state (step S5). In the state of step S5, a check is now made to see if the comparison result of the output levels of the first and second photodetectors 8 and 12 obtained by the second comparator 10 lies within a predetermined range set in the window comparator 24 (an abnormality detection signal exists) or not (no abnormality detection signal exists) (step S6). In step S6, when the comparison result of the output levels of the first and second photodetectors 8 and 12 obtained by the second comparator 10 lies within the predetermined range set in the window comparator 24, the control means 25 determines that no abnormality exists and connects the common terminal of the selecting switch means 21 to the terminal b. The output of the first photodetector 8 is, consequently, supplied to the first comparator 9 and the APC can be executed (step S7). After step S7, the loop switch 28 is turned on (the common terminal is connected to the terminal a) and the de-focusing state is canceled and a focusing servo enable mode is set (step S8). In steps S4 and S6, when the comparison results of the output levels are out of the predetermined ranges set in the window comparator 23 and 24, the shut-off switch means 22 is opened and the connection of the first comparator 9 and laser diode 1 is disconnected, thereby preventing that the driving current flows into the laser diode 1 (step S9). The spindle motor 2 is subsequently stopped (step S10) and a warning is displayed by the display means 27 (step S11).

Figure 4:
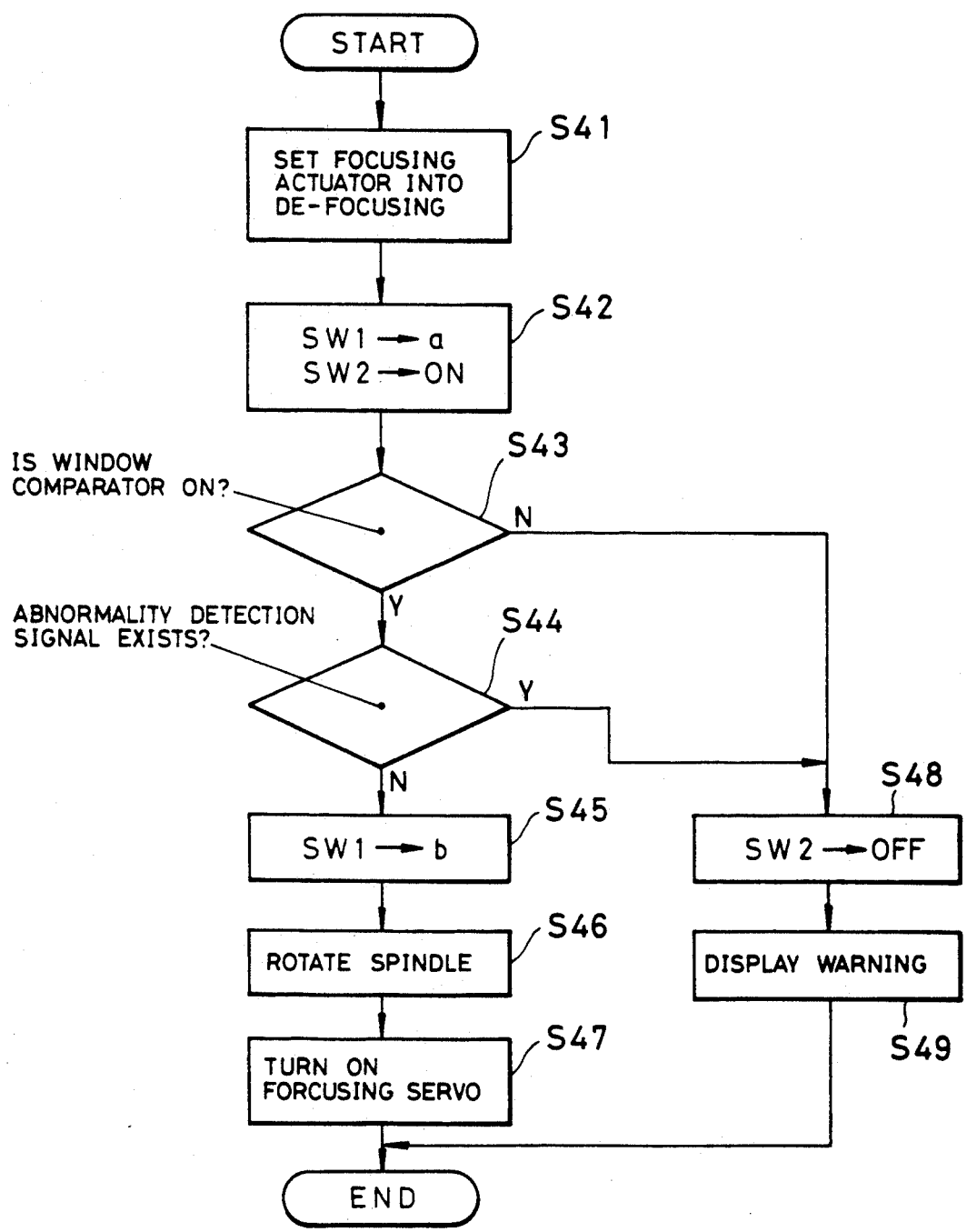

The present invention can also operate by a flowchart as shown in FIG. 4 for detecting an abnormality without rotating the spindle.

First, the loop switch 28 is turned off (the common terminal is connected to the terminal b), the maximum de-focusing driving voltage is applied to the actuator 26, and the objective lens 6 is positioned to the most deviated position from the neutral position and is fixed into the maximum de-focusing mode (step S41). To detect a failure of the laser diode 1, the common terminal of the selecting switch means 21 is subsequently connected to the terminal a. The shut-off switch means 22 is closed. The first comparator 9, accordingly, compares the output of the second photodetector 12 and the reference input REF and generates the laser diode driving current corresponding to the result of the comparison to the laser diode 1 and window comparator 23 (step S42). In step S42, a check is made to see if the obtained comparison result lies within a predetermined range set in the window comparator 23 or not (step S43). In step S43, when it is determined that the obtained comparison result lies within the predetermined range set in the window comparator 23, a check is now made to see if the comparison result of the output levels of the first and second photodetectors 8 and 12 obtained by the second comparator 10 lies within a predetermined range set in the window comparator 24 (an abnormality detection signal exists) or not (no abnormality detection signal exists) (step S44). In step S44, when the comparison result of the output levels of the first and second photodetectors 8 and 12 obtained by the second comparator 10 lies within the predetermined range set in the window comparator 24, the absence of abnormality is determined and the common terminal of the selecting switch means 21 is connected to the terminal b. The output of the first photodetector 8 is, consequently, supplied to the first comparator 9 and the APC can be performed (step S45). A rotation driving command is given to the spindle motor 2 (step S46). After step S46, the loop switch 28 is turned on (the common terminal is connected to the terminal a) and the de-focusing state is canceled and the focusing servo enable mode is set (step S47). In steps S43 and S44, when the comparison results of the output levels are out of the predetermined ranges set in the window comparator 23 and 24, the shut-off switch means 22 is opened and the connection between the first comparator 9 and laser diode 1 is disconnected, thereby preventing that the driving current flows into the laser diode 1 (step S48). A warning is displayed by the display means (step S49).

Figure 5:
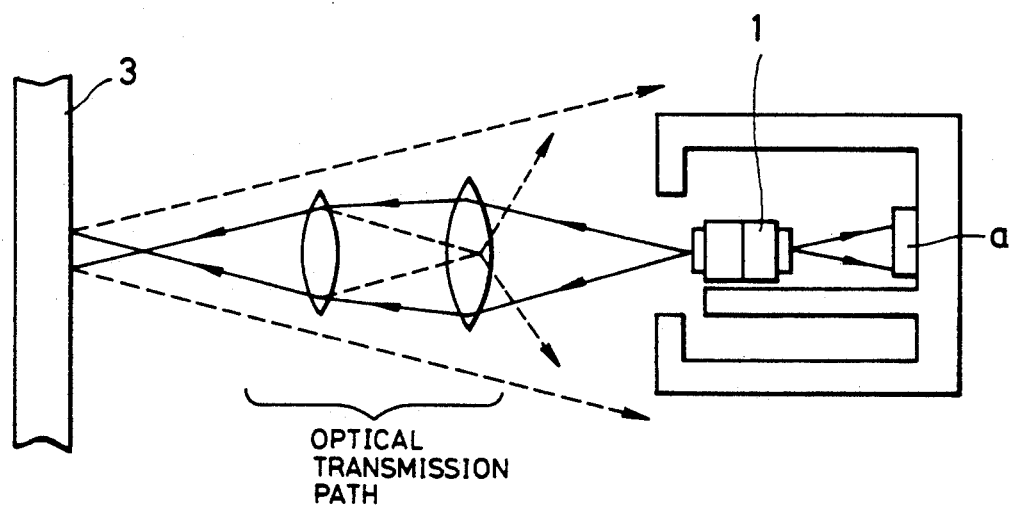
FIG. 5 is a diagram showing a path of a return light according to the invention.

FIG. 5 is a diagram showing a path of the return light in the de-focusing state. the first light beam irradiated from the laser diode 1 passes through the optical transmission path comprising the lens, splitter, and the like and is let to the optical recording medium 3 as shown by solid lined. Since the optical transmission path is in the de-focusing state in this instance, the first light beam reflected by the optical recording medium 3 is diffused as shown by dashed lines and an amount of return light to the laser diode 1 becomes very small. When the first light beam is diffused as shown by the dashed lines, a part of the first light beam enters a photodetector a.

Such a partial light, however, can be solved by setting the de-focusing state into the maximum de-focusing state.

The above control operation can be also properly executed even in case where no disc is loaded.

In the laser diode drive control apparatus according to the invention as mentioned above, intensities of the front and rear beams irradiated from the laser diode provided as a light source are compared by setting the optical system into the de-focusing state for a time just before the recording and reproducing operations are started such as time point of the power-on of the apparatus, completion of the loading, or the like, thereby detecting an abnormality of the optical system. An abnormality, therefore, can be accurately detected.

What is claimed is:

1. A laser diode drive control apparatus comprising:
   a laser diode irradiating first and second light beams in front and rear directions, said light beams having an intensity according to a magnitude of a driving current supplied thereto;
   optical transmitting means including an objective lens for leading said first light beam to an optical recording medium;
   a focusing servo loop for driving an actuator of said objective lens, thereby performing a focusing servo operation;
   first light beam detecting means for generating a first detection signal having a level according to a level of the first light beam which is led to the optical recording medium;
   second light beam detecting means for generating a second detection signal having a level according to a level of the second light beam; and
   control means for comparing the levels of said first and second detection signals and controlling said driving current,
   wherein said control means comprising first means for turning off a loop switch of said focusing servo loop of said objective lens, thereby setting the lens into a de-focusing state,
   discriminating means for comparing the levels of the first and second detection signals after said de-focusing state of the lens by the actuator by the first means was obtained, thereby discriminating whether a ratio of said levels lies within a predetermined range or not, and
   second means for shutting off the driving current when it is determined by said discriminating means that said ratio is out of said predetermined range.

2. An apparatus according to claim 1, wherein said first means includes de-focusing voltage applying means for giving a driving voltage to position the objective lens to a most deviated position from a neutral position to said actuator.

* * * * *